United States Patent

Fujimura et al.

(10) Patent No.: US 9,502,058 B2
(45) Date of Patent: Nov. 22, 2016

(54) SUSPENSION BOARD WITH CIRCUIT

(71) Applicant: NITTO DENKO CORPORATION, Osaka (JP)

(72) Inventors: Yoshito Fujimura, Osaka (JP); Hiroyuki Tanabe, Osaka (JP); Saori Kanezaki, Osaka (JP); Naohiro Terada, Osaka (JP); Yuu Sugimoto, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 14/878,319

(22) Filed: Oct. 8, 2015

(65) Prior Publication Data

US 2016/0111115 A1 Apr. 21, 2016

(30) Foreign Application Priority Data

Oct. 15, 2014 (JP) ................................. 2014-210618

(51) Int. Cl.
*G11B 5/48* (2006.01)
(52) U.S. Cl.
CPC ............. *G11B 5/4853* (2013.01); *G11B 5/484* (2013.01); *G11B 5/4826* (2013.01)
(58) Field of Classification Search
None
See application file for complete search history.

(56) References Cited

U.S. PATENT DOCUMENTS

| 8,014,103 | B2 * | 9/2011 | Ohsawa | G11B 5/486 |
| | | | | 360/234.5 |
| 8,913,348 | B2 * | 12/2014 | Higuchi | G11B 5/486 |
| | | | | 360/234.5 |
| 9,183,879 | B2 * | 11/2015 | Fujimura | G11B 21/16 |
| 2009/0101399 | A1 * | 4/2009 | Iguchi | G11B 5/486 |
| | | | | 174/260 |
| 2009/0116150 | A1 | 5/2009 | Ohsawa et al. | |
| 2009/0310908 | A1 * | 12/2009 | Kanagawa | G02B 6/43 |
| | | | | 385/14 |
| 2009/0310909 | A1 * | 12/2009 | Ishii | G02B 6/43 |
| | | | | 385/14 |

FOREIGN PATENT DOCUMENTS

JP 2009-116969 A 5/2009

* cited by examiner

*Primary Examiner* — Will J Klimowicz
(74) *Attorney, Agent, or Firm* — Jean C. Edwards, Esq.; Edwards Neils LLC

(57) ABSTRACT

A suspension board with circuit includes a metal supporting layer, an insulating base layer on one side thereof in a thickness direction, a conductive pattern disposed on the insulating base layer, an insulating cover layer disposed on the insulating base layer so as to cover the conductive pattern, and a pedestal for supporting a slider which includes a thin pedestal portion. The thin pedestal portion includes a pedestal base layer included in the insulating base layer, a pedestal conductive layer included in the conductive pattern which extends over the pedestal base layer, and a pedestal cover layer included in the insulating cover layer and disposed on the pedestal conductive layer. The conductive pattern includes a first wire placed to extend over the insulating base layer which has a narrower portion, and a dimension of the pedestal conductive layer is 0.5 to 3 times the dimension of the narrower portion.

5 Claims, 8 Drawing Sheets

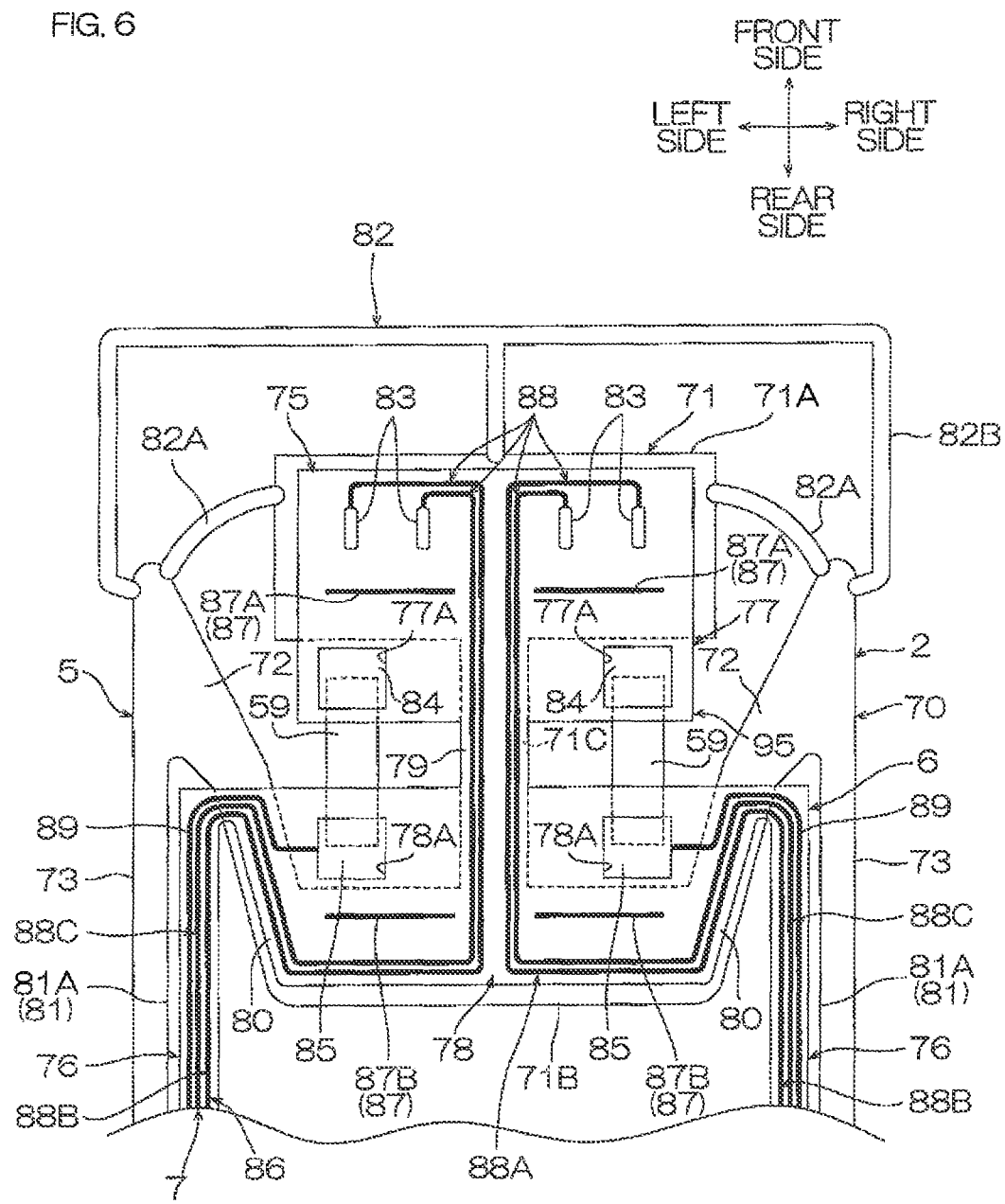

SUSPENSION BOARD WITH CIRCUIT

CROSS-REFERENCE TO RELATED APPLICATION

The present application claims priority from Japanese Patent Application No. 2014-210618 filed on Oct. 15, 2014, the content of which is herein incorporated by reference into this application.

BACKGROUND OF THE INVENTION

Field of the Invention

The present invention relates to a suspension board with circuit, and particularly to a suspension board with circuit used in a hard disk drive.

Description of the Related Art

Conventionally, a suspension board with circuit has been known which is mounted in a hard disk drive, while a slider having a magnetic head is mounted thereon. The suspension board with circuit includes a metal supporting board, an insulating base layer formed on a surface of the metal supporting board located on one side thereof a conductive layer formed on a surface of the insulating base layer located on one side thereof and including wires, and an insulating cover layer formed on the surface of the insulating base layer located on the one side thereof and covering the wires.

As an example of such a suspension board with circuit, a suspension board with circuit including a pedestal which supports a slider has been proposed. The pedestal includes a lower pedestal made of an insulating layer and an upper pedestal made of a conductive layer and formed on the lower pedestal (see, e.g., Japanese Unexamined Patent No. 2009-116969).

In the suspension board with circuit, a slider is placed on the pedestal so as to come in contact with the upper pedestal.

SUMMARY OF THE INVENTION

However, in the suspension board with circuit described in Japanese Unexamined Patent No. 2009-116969, the slider comes in contact with the upper pedestal made of the conductive layer. As a result, the slider and the upper pedestal may be damaged.

To prevent this, it is considered to configure an insulating cover layer such that wires and the upper pedestal are covered therewith and place the slider on the insulating cover layer covering the upper pedestal.

The thickness of the insulating cover layer depends on the dimensions of an object to be covered (wires or upper pedestal). Specifically, the insulating cover layer is formed thicker as the dimensions of the object to be covered are larger and formed thinner as the dimensions of the object to be covered are smaller. Accordingly, in order to inhibit the object to be covered from being exposed from the insulating cover layer, the thickness of the insulating cover layer is generally set on the basis of the portion of the object to be covered which has a smallest dimension.

In the suspension board with circuit described in Japanese Unexamined Patent No. 2009-116969, the wires are formed to have a widthwise dimension smaller than a widthwise dimension of the upper pedestal. Accordingly, the insulating cover layer is formed such that the portion thereof covering the upper pedestal has a thickness larger than the thickness of the portion thereof covering the wires and consequently larger than the set value (reference value) of the thickness of the insulating cover layer.

As a result, a problem arises in that the accuracy of the position of the slider placed on the portion of the insulating cover layer covering the upper pedestal deteriorates in a thickness direction.

It is therefore an object of the present invention to provide a suspension board with circuit which can inhibit wires from being exposed from an insulating cover layer and also allows an improvement in the accuracy of the position of a slider in a thickness direction.

(1) The present invention is a suspension board with circuit including a metal supporting layer, an insulating base layer disposed on a surface of the metal supporting layer located on one side thereof in a thickness direction, a conductive pattern disposed on a surface of the insulating base layer located on one side thereof in the thickness direction, an insulating cover layer disposed on the surface of the insulating base layer located on the one side thereof in the thickness direction so as to cover the conductive pattern, and a pedestal for supporting a slider which includes a thin pedestal portion. The thin pedestal portion includes a pedestal base layer included in the insulating base layer, a pedestal conductive layer included in the conductive pattern and disposed so as to extend over the pedestal base layer, and a pedestal cover layer included in the insulating cover layer and disposed on the pedestal conductive layer. The conductive pattern includes a first wire placed so as to extend over the insulating base layer. The first wire has a narrower portion where a dimension in a wire width dimension perpendicular to a direction in which the first wire extends is smallest. A dimension of the pedestal conductive layer in a pedestal width direction perpendicular to a direction in which the pedestal conductive layer extends is 0.5 to 3 times the dimension of the narrower portion in the wire width direction.

In such a configuration, the dimension of the pedestal conductive layer in the pedestal width direction is 0.5 to 3 times the dimension of the narrower portion of the first wire in the wire width direction. Accordingly, the ratio of the thickness of the pedestal cover layer to the thickness of the insulating cover layer covering the narrower portion falls within a predetermined range.

As a result, even when the thickness of the insulating cover layer is set on the basis of the thickness of the portion thereof covering the narrower portion, it is possible to inhibit the thickness of the pedestal cover layer from significantly deviating from the set value of the thickness of the insulating cover layer.

This allows the narrower portion to be reliably covered and also allows an improvement in the accuracy of the position of a slider in the thickness direction.

Therefore, in the suspension board with circuit in the present invention, it is possible to inhibit the wires from being exposed from the insulating cover layer and improve the accuracy of the position of the slider in the thickness direction.

(2) The present invention includes a suspension board with circuit as described in (1) above which further includes a slider mounting region including the pedestal and in which the narrower portion is disposed outside the slider mounting region to be spaced apart from the pedestal conductive layer.

In such a configuration, the narrower portion of the first wire in which the dimension in the wire width direction is smallest is disposed in the vicinity of the slider mounting region. This can save space around the slider mounting region in the suspension board with circuit and consequently reduce the size of the suspension board with circuit.

(3) The present invention includes a suspension board with circuit as described in (1) or (2) above in which the conductive pattern includes a second wire placed so as to extend over the insulating base layer, and the pedestal conductive layer is formed as a part of the second wire.

In such a configuration, the pedestal conductive layer can be used also as a part of the second wire. This can ensure efficient placement of the pedestal conductive layer and the second wire and allows effective use of space.

(4) The present invention includes a suspension board with circuit as described in (3) above in which the second wire is grounded to the metal supporting layer.

In such a configuration, the second wire having a part thereof configured as the pedestal conductive layer is grounded to the metal supporting layer. As a result, even when the pedestal conductive layer is electrically affected by the slider, it is possible to inhibit the movement of the suspension board with circuit from being affected thereby.

(5) The present invention includes a suspension board with circuit as described in any one of (1) to (4) above in which a plurality of the pedestal conductive layers are arranged to be spaced apart from each other in the pedestal width direction.

In such a configuration, the plurality of pedestal conductive layers are arranged. This allows the pedestal to more stably support the slider.

BRIEF DESCRIPTION OF THE DRAWINGS

FIG. 6 is a plan view of the mounting portion shown in FIG. 5, which shows a state without an insulating cover layer;

DETAILED DESCRIPTION OF THE INVENTION

1. First Embodiment

Figure 1:
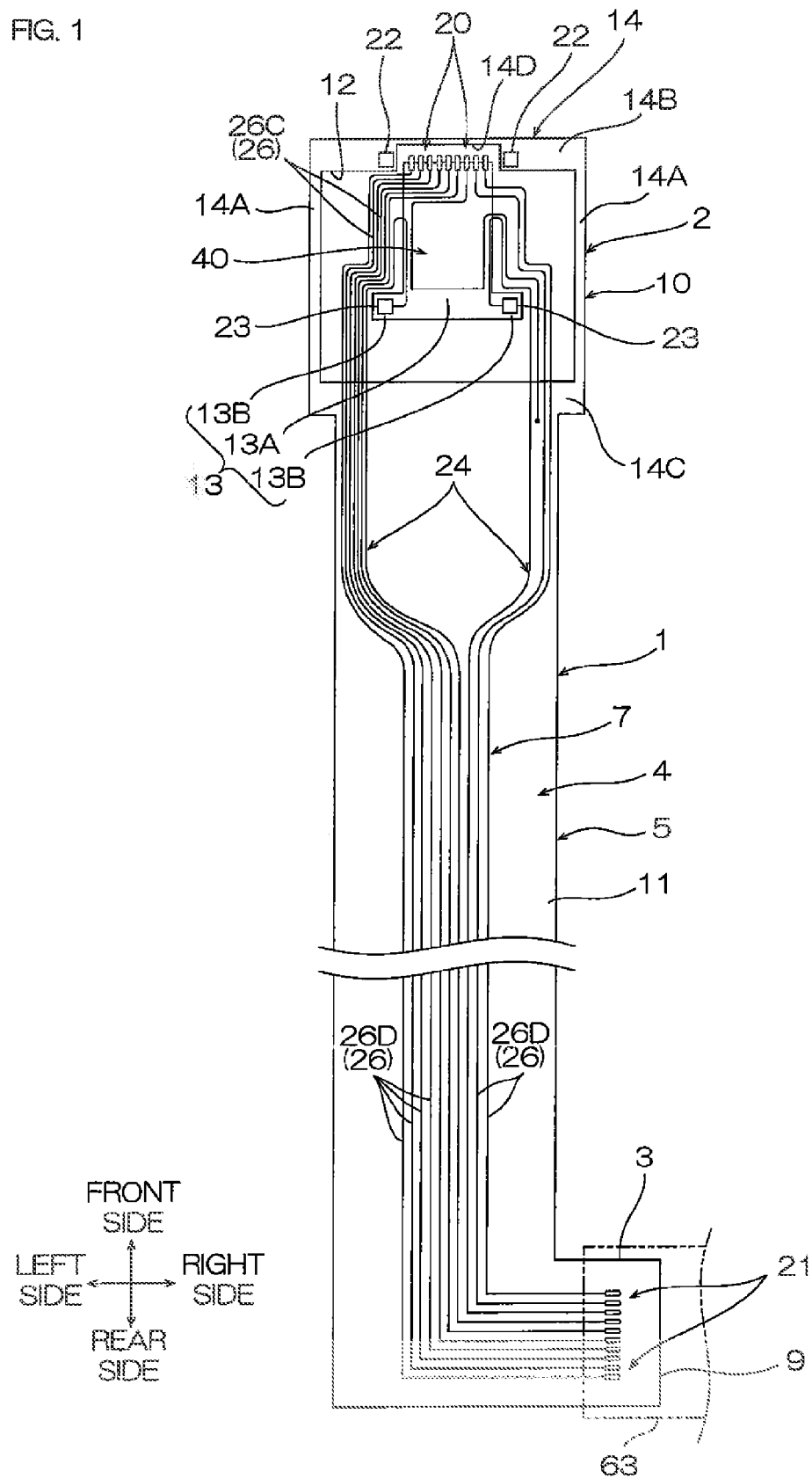
FIG. 1 is a plan view of a suspension board with circuit as a first embodiment of the present invention.

As shown in FIG. 1, a suspension board with circuit 1 is mounted in a hard disk drive (not shown), while a slider 60 (see FIGS. 3 and 4) having a magnetic head (not shown) is mounted thereon.

The suspension board with circuit 1 mounted in the hard disk drive (not shown) supports the magnetic head (not shown), while holding a minute gap between the magnetic head (not shown) and a magnetic disk (not shown), against an air flow when the magnetic head and the magnetic disk travel relatively to each other.

The suspension board with circuit 1 is formed in a generally flat belt shape extending in a longitudinal direction. The suspension board with circuit 1 includes a mounting portion 2 which is located on one side (upper side of the surface of the paper sheet with FIG. 1) thereof in the longitudinal direction and on which a slider 60 (see FIG. 3) including a magnetic head (not shown) is mounted, an external connecting portion 3 located on the other side (lower side of the paper sheet with FIG. 1) thereof in the longitudinal direction and electrically connected to an external control board 63, and a wire portion 4 extending in the longitudinal direction between the mounting portion 2 and the external connecting portion 3.

In the following description, when directions are mentioned, it is assumed that the one side in the longitudinal direction on which the mounting portion 2 is provided is the front side of the suspension board with circuit 1 and the other side in the longitudinal direction on which the external connecting portion 3 is provided is the rear side of the suspension board with circuit 1. It is also assumed that the left and right sides of the surface of the paper sheet with FIG. 1 are the left and right sides of the suspension board with circuit 1. It is also assumed that the front and back sides in a depth direction perpendicular to the paper sheet with FIG. 1 are the upper and lower sides of the suspension board with circuit 1. Specifically, the directions are based on the direction arrows shown in each of the drawings.

Note that an upper-lower direction is an example of a thickness direction, the upper side is an example of the one side in the thickness direction, and the lower side is an example of the other side in the thickness direction.

Figure 4:
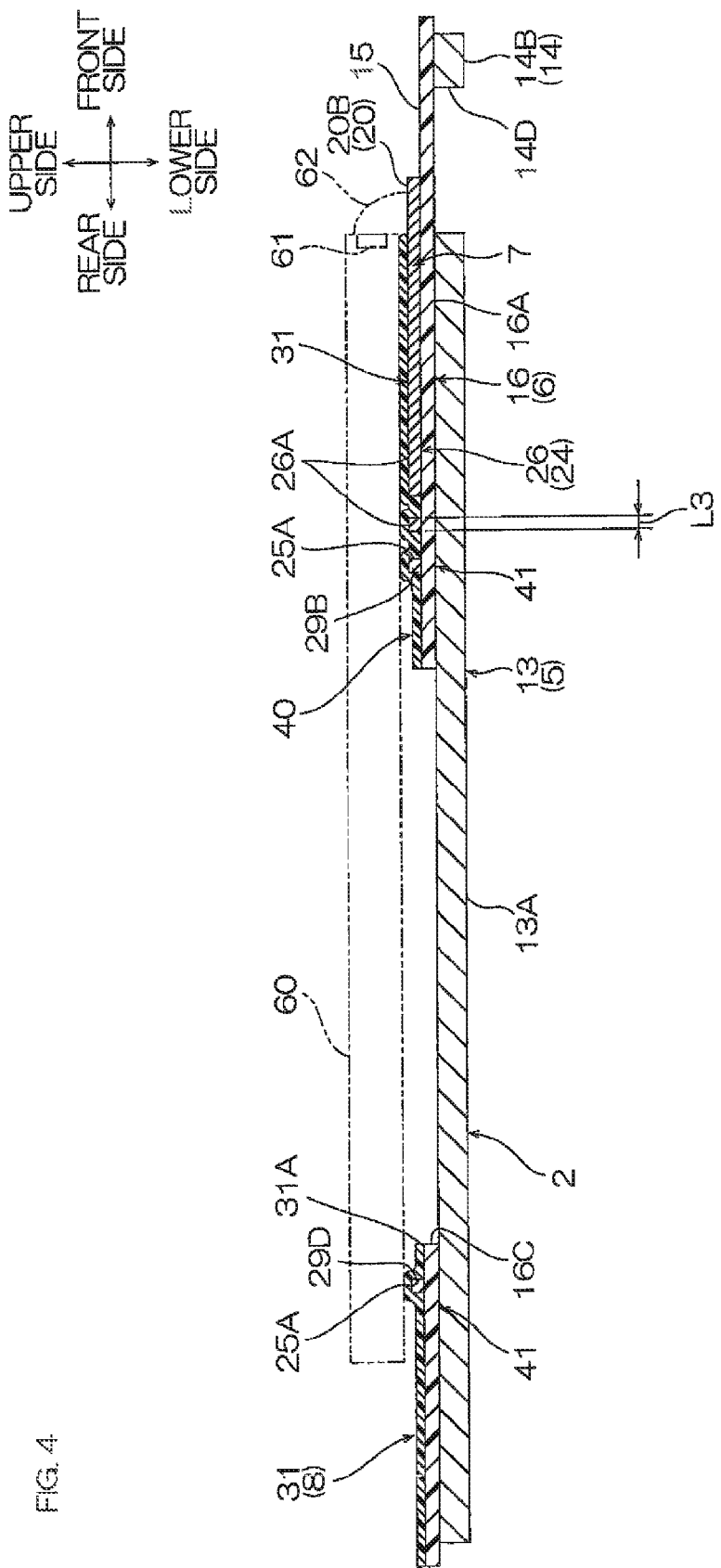
FIG. 4 is a B-B cross-sectional view of the mounting portion shown in FIG. 2.

As shown in FIG. 4, the suspension board with circuit 1 has a laminated structure. Specifically, a supporting board 5 as an example of a metal supporting layer, an insulating base layer 6, a conductive pattern 7, and an insulating cover layer 8 are upwardly laminated in succession. Note that, in FIG. 1, for the sake of convenience, the insulating base layer 6 and the insulating cover layer 8 are omitted and, in FIG. 2, the insulating cover layer 8 is omitted.

As shown in FIG. 1, the supporting board 5 includes a gimbal portion 10 corresponding to the mounting portion 2, a wire supporting portion 11 corresponding to the wire portion 4, and a connecting board portion 9 corresponding to the external connecting portion 3.

The gimbal portion 10 is the front end portion of the supporting board 5 which is formed in a generally rectangular plate shape in plan view.

In the gimbal portion 10, a gimbal opening 12 is formed. The gimbal opening 12 is formed in a generally rectangular frame shape in plan view to extend through the gimbal portion 10 in the upper-lower direction. As a result, the gimbal portion 10 is partitioned into a peripheral edge portion 14 and a reinforcing portion 13.

The peripheral edge portion 14 is the peripheral edge portion of the gimbal portion 10 which is formed in a generally rectangular frame shape in plan view. The peripheral edge portion 14 includes a plurality of (two) outrigger portions 14A, a front-side continuous portion 14B, and a rear-side continuous portion 14C.

The pair of outrigger portions 14A are the both left and right end portions of the peripheral edge portion 14 which are disposed to be spaced apart from each other in a left-right direction. Each of the outrigger portions 14A is formed in a generally rectangular shape in plan view extending in a front-rear direction.

The front-side continuous portion 14B is the front end portion of the peripheral edge portion 14 which is provided to extend between the front end portions of the pair of outrigger portions 14A. The front-side continuous portion 14B is formed in a generally rectangular shape in plan view extending in the left-right direction.

In the front-side continuous portion 14B, a recessed portion 14D is formed. The recessed portion 14D is formed in a generally recessed shape in plan view which is rearwardly open. The recessed portion 14D is recessed frontwardly from the generally middle portion of the rear end edge of the front-side continuous portion 14B in the left-right direction.

The rear-side continuous portion 14C is the rear end portion of the peripheral edge portion 14 which is provided to extend between the rear end portions of the pair of outrigger portions 14A. The rear-side continuous portion 14C is formed in a generally rectangular shape in plan view extending in the left-right direction.

Figure 2:
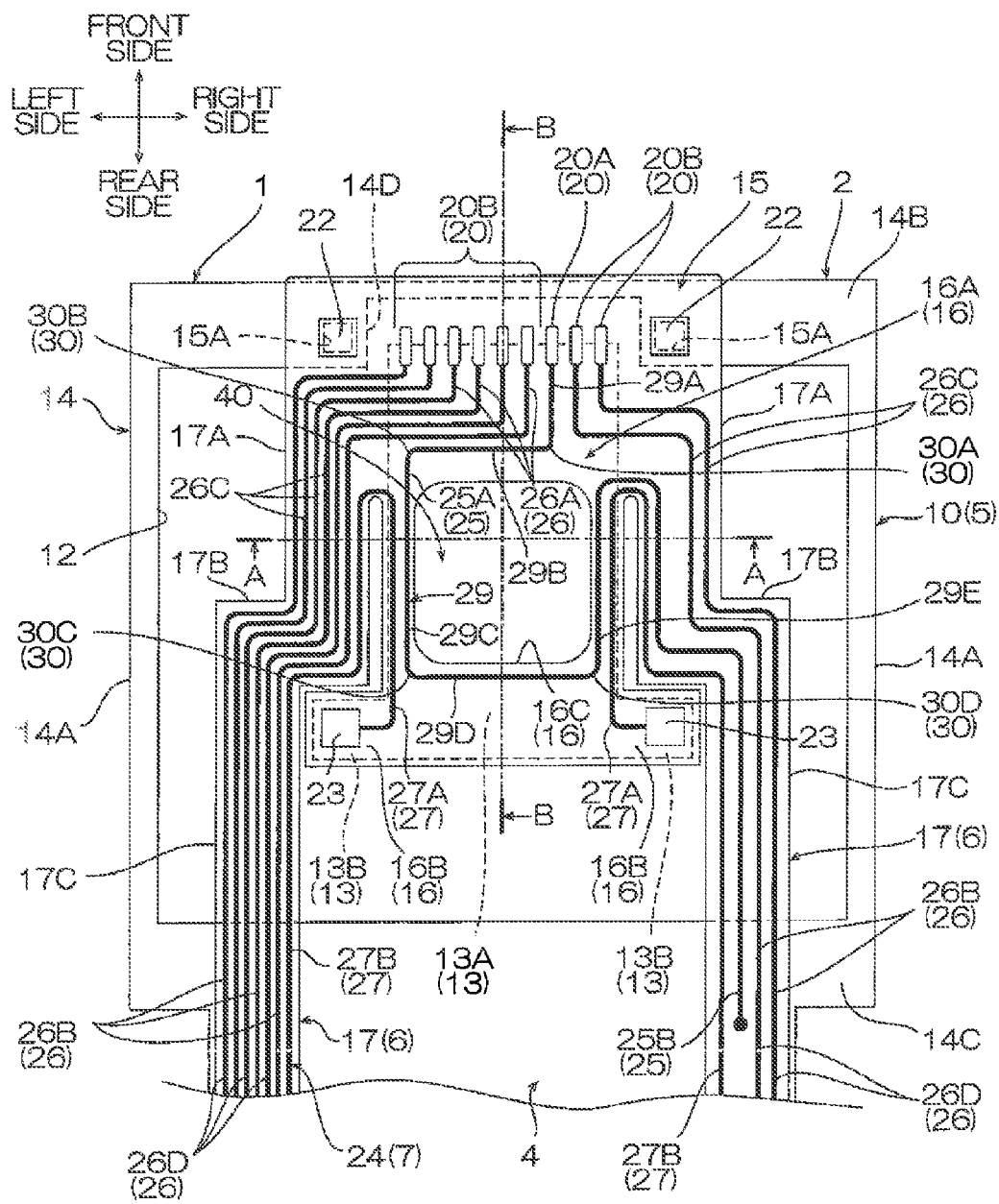
FIG. 2 is an enlarged view of the mounting portion of the suspension board with circuit shown in FIG. 1.

As shown in FIG. 2, the reinforcing portion 13 is disposed in the gimbal opening 12 to be spaced apart from the peripheral edge portion 14. The reinforcing portion 13 is formed in a generally T-shaped shape in plan view and has a rectangular portion 13A and a pair of protruding portions 13B.

The rectangular portion 13A has a generally rectangular shape in plan view extending in the front-rear direction.

The pair of protruding portions 13B are disposed on both left and right sides of the rear end portion of the rectangular portion 13A to protrude outwardly from the both left and right end portions of the rectangular portion 13A in the left-right direction. Each of the protruding portions 13B is formed in a generally rectangular shape in plan view.

As shown in FIG. 1, the wire supporting portion 11 is formed in a generally flat belt shape in plan view extending continuously rearwardly from the rear end portion of the peripheral edge portion 14.

The connecting board portion 9 is formed in a generally rectangular shape in plan view protruding continuously rightwardly from the rear end portion of the wire supporting portion 11.

The supporting board 5 is formed of a metal material such as, e.g., stainless steel, a 42-alloy, aluminum, a copper-beryllium alloy, or phosphor bronze. Preferably, the supporting board 5 is formed of stainless steel. The thickness of the supporting board 5 is in a range of, e.g., not less than 10 μm, or preferably not less than 15 μm and, e.g., not more than 35 μm, or preferably not more than 25 μm.

As shown in FIG. 4, the insulating base layer 6 is laminated (placed) on the upper surface of the supporting board 5 (surface located on one side thereof in a thickness direction). As shown in FIG. 2, the insulating base layer 6 includes a first terminal formation portion 15, a slider mounting portion 16 as an example of a pedestal base layer, and a plurality of (two) wire formation portions 17.

The first terminal formation portion 15 is the front end portion of the insulating base layer 6 which is disposed on the front-side connecting portion 14B so as to cover the recessed portion 14D. The first terminal formation portion 15 is formed in a generally rectangular shape in plan view extending in the left-right direction. In the first terminal formation portion 15, a plurality of (two) through holes 15A are formed.

The plurality of through holes 15A are located to be spaced apart from each other in the left-right direction such that the recessed portion 14D is interposed therebetween when viewed from above. Each of the plurality of through holes 15A is formed in a generally rectangular shape in plan view to extend through the first terminal formation portion 15 in the upper-lower direction.

The slider mounting portion 16 is disposed on the reinforcing portion 13. The slider mounting portion 16 includes a main body portion 16A and a pair of second terminal formation portions 16B.

The main body portion 16A is disposed on the rectangular portion 13A of the reinforcing portion 13. The front end portion of the main body portion 16A is connected to the rear end portion of the first terminal formation portion 15. The main body portion 16A is formed in substantially the same shape as the outer shape of the rectangular portion 13A. The outer peripheral edge of the main body portion 16A is disposed slightly externally of the outer peripheral edge of the rectangular portion 13A.

In the main body portion 16A, an opening 16C is formed. The opening 16C is located at generally the middle of the main body portion 16A in the front-rear direction. The opening 16C is formed in a generally rectangular shape in plan view to extend through the main body portion 16A in the thickness direction.

The pair of second terminal formation portions 16B are disposed over the pair of protruding portions 13B of the reinforcing portion 13 to protrude outwardly from the rear end portion of the main body portion 16A in the left-right direction. The second terminal formation portions 16B are formed in substantially the same shapes as the outer shapes of the protruding portions 13B. The outer peripheral edges of the second terminal formation portions 16B are disposed slightly externally of the outer peripheral edges of the protruding portions 13B.

Specifically, the plurality of wire formation portions 17 are the pair of wire formation portions 17 which are disposed to be spaced apart from each other in the left-right direction such that the slider mounting portion 16 is interposed therebetween. Each of the plurality of wire formation portions 17 extends in the front-rear direction and includes a first linear portion 17A, a protruding portion 17B, and a second linear portion 17C.

The first linear portions 17A are the front end portions of the wire formation portions 17 which are disposed externally of the main body portion 16A of the slider mounting portion 16 in the left-right direction to be spaced apart therefrom, while being disposed inwardly of the outrigger portions 14A in the left-right direction to be spaced apart therefrom. The front end portions of the first linear portions 17A are continued to the end portions of the first terminal formation portion 15 in the left-right direction and also continued to the front end portion of the main body portion 16A of the slider mounting portion 16. The rear end portions of the first linear portions 17A are disposed on the front side of the second terminal formation portions 16B to be slightly spaced apart therefrom.

The protruding portions 17B extend externally of the second terminal formation portions 16B in the left-right direction in such a manner as to go around the corners thereof and then extend rearwardly. Specifically, the protruding portions 17B extend continuously outwardly from the rear end portions of the first linear portions 17A in the left-right direction to bend and extend rearwardly and externally of the second terminal formation portions 16B in the left-right direction. The protruding portions 17B are disposed externally of the second terminal formation portions 16B in the left-right direction to be inwardly spaced apart from the outrigger portions 14A in the left-right direction.

The second linear portions 17C extend continuously rearwardly from the rear end portions of the protruding portions 17B. The second linear portions 17C are disposed over the wire supporting portion 11 and the connecting board portion 9.

The insulating base layer 6 is made of a synthetic resin such as, e.g., polyimide, polyamide imide, acryl, polyether, nitrile, polyether sulfone, polyethylene terephthalate (PET), polyethylene naphthalate, or polyvinyl chloride. Preferably, in terms of thermal dimensional stability or the like, the insulating base layer 6 is formed of polyimide. The thickness of the insulating base layer 6 is in a range of, e.g., not less than 1 μm, or preferably not less than 3 μm and, e.g., not more than 25 μm, or preferably not more than 15 μm.

As shown in FIG. 4, the conductive pattern 7 is disposed on the upper surface of the insulating base layer 6 (surface located on one side thereof in the thickness direction). As shown in FIGS. 1 and 2, the conductive pattern 7 includes a plurality of (nine) magnetic head connecting terminals 20, a plurality of (ten) external connecting terminals 21, a plurality of (two) first terminals 22, a plurality of (two) second terminals 23, and a plurality of (eleven) wires 24.

As shown in FIG. 2, the plurality of magnetic head connecting terminals 20 are disposed in parallel on the front end portion of the insulating base layer 6 to be spaced apart from each other in the left-right direction. Each of the plurality of magnetic head connecting terminals 20 is formed in a generally rectangular shape in plan view extending in the front-rear direction. Each of the magnetic head connecting terminals 20 has a front-side portion thereof disposed on the first terminal formation portion 15 and a rear-side portion thereof disposed on the slider mounting portion 16.

The plurality of magnetic head connecting terminals 20 include a ground terminal 20A and a plurality of signal terminals 20B.

The ground terminal 20A is the third one of the plurality of magnetic head connecting terminals 20 from the right. The plurality of signal terminals 20B are the plurality of magnetic head connecting terminals 20 other than the ground terminal 20A.

As shown in FIG. 1, each of the plurality of external connecting terminals 21 is connected to the external control board 63. The shapes and layout of the external connecting terminals 21 and a joining method therefor can be selected arbitrarily depending on the configuration of the external control board 63. In this embodiment, the plurality of external connecting terminals 21 are disposed in parallel on the rear end portions of the wire formation portions 17 to be spaced apart from each other in the front-rear direction. Each of the plurality of external connecting terminals 21 is formed in a generally rectangular shape in plan view extending in the left-right direction.

As shown in FIG. 2, the plurality of first terminals 22 are disposed on the first terminal formation portion 15 to be spaced apart from each other in the left-right direction so as to fill the plurality of respective through holes 15A. Thus, the first terminals 22 are brought into contact with the front-side connecting portion 14B of the peripheral edge portion 14 via the through holes 15A and electrically connected (grounded) to the supporting board 5. Each of the plurality of first terminals 22 is formed in a generally rectangular shape in plan view.

The plurality of second terminals 23 are disposed on the respective corresponding second terminal formation portions 16B. Each of the plurality of second terminals 23 is formed in a generally rectangular shape in plan view.

The plurality of wires 24 include a ground wire 25 as an example of a second wire, a plurality of (eight) first signal wires 26 as an example of a first wire, and a plurality of (two) second signal wires 27 as an example of the second wire.

The ground wire 25 is formed to extend continuously from the rear end portion of the ground terminal 20A, pass over the main body portion 16A of the slider mounting portion 16 and the wire formation portions 17, and then be grounded to the supporting board 5.

That is, the ground wire 25 is routed so as to extend over the slider mounting portion 16 and the wire formation portions 17 and includes a first portion 25A as an example of a pedestal conductive layer and a second portion 25B.

The first portion 25A is the portion of the ground wire 25 which is disposed over the slider mounting portion 16. The first portion 25A is routed to extend continuously rearwardly from the rear end portion of the ground terminal 20A and then bend leftwardly into in a generally U-shaped shape in plan view which is opened frontwardly so as to surround the opening 16C.

Specifically, the first portion 25A includes a plurality of linear portions 29 and a plurality of corner portions 30.

Each of the plurality of linear portions 29 is formed so as to extend linearly over the slider mounting portion 16. The plurality of linear portions 29 include a first linear portion 29A, a second linear portion 29B, a third linear portion 29C, a fourth linear portion 29D, and a firth linear portion 29E.

The first linear portion 29A extends continuously rearwarwardly from the rear end portion of the ground terminal 20A. The rear end portion of the first linear portion 29A is located on the front side of the front end edge of the opening 16C of the slider mounting portion 16.

The second linear portion 29B extends continuously leftwardly from the rear end portion of the first linear portion 29A. The left end portion of the second linear portion 29B is located on the left side of the left end edge of the opening 16C and on the right side of the left end edge of the rectangular portion 13A.

The third linear portion 29C extends continuously rearwardly from the left end portion of the second linear portion 29B along the left end edge of the opening 16C. The rear end portion of the third linear portion 29C is located on the rear side of the rear end edge of the opening 16C.

The fourth linear portion 29D extends continuously rightwardly from the rear end portion of the third linear portion 29C along the rear end edge of the opening 16C. The right end portion of the fourth linear portion 29D is located on the right side of the right end edge of the opening 16C and on the left side of the right end edge of the rectangular portion 13A.

The fifth linear portion 29E extends continuously frontwardly from the right end portion of the fourth linear portion 29D along the right end edge of the opening 16C. The front end portion of the fifth linear portion 29E is located at generally the same position as that of the front end edge of the opening 16C in the front-rear direction.

The plurality of corner portions 30 include a first corner portion 30A, a second corner portion 30B, a third corner portion 30C, and a fourth corner portion 30D.

The first corner portion 30A is a connecting portion between the first and second linear portions 29A and 29B. The second corner portion 30B is a connecting portion between the second and third linear portions 29B and 29C. The third corner portion 30C is a connecting portion between the third and fourth linear portions 29C and 29D.

The fourth corner portion 30D is a connecting portion between the fourth and fifth linear portions 29D and 29E.

Figure 3:
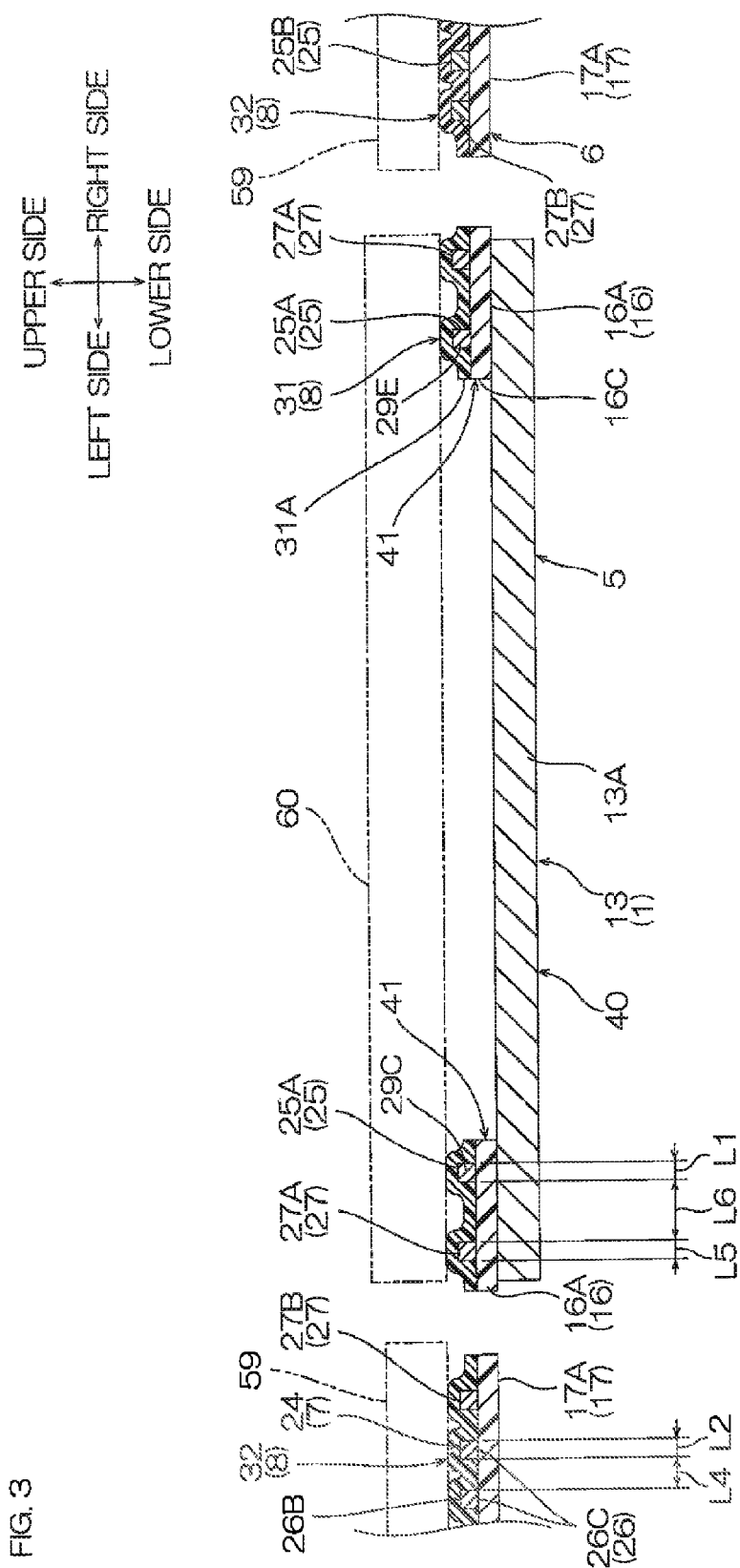
FIG. 3 is an A-A cross-sectional view of the mounting portion shown in FIG. 2.

As shown in FIG. 3, a dimension L1 (an example of a dimension in a pedestal width direction) of the first portion 25A in a widthwise direction perpendicular to the extending direction thereof is in a range of, e.g., not less than 5 μm, or preferably not less than 8 μm and, e.g., not more than 50 μm, or preferably not more than 40 μm. That is, the respective dimensions L1 of the third and fifth linear portions 29C and 29E in the left-right direction are within the foregoing range, and the dimension L1 of the fourth linear portion 29D in the front-rear direction is within the foregoing range.

The widthwise dimension L1 of the first portion 25A is, e.g., not less than 0.5 times, preferably not less than 0.75 times, or more preferably not less than 0.9 times and, e.g., not more than 3 times, preferably not more than 1.5 times, more preferably not more than 1.1 times, or most preferably 1 times a widthwise dimension L2 of a narrower portion 26C described later.

As shown in FIG. 2, the second portion 25B is the portion of the ground wire 25 which is disposed on the wire formation portion 17. The second portion 25B bends continuously from the front end portion of the fifth linear portion 29E of the first portion 25A in such a manner as to make a U-turn. After successively passing over the first linear portion 17A, the protruding portion 17B, and the second linear portion 17C, the second portion 25B extends through an opening not shown in the second linear portion 17C to be connected (grounded) to the supporting board 5.

The plurality of first signal wires 26 are formed in mutually spaced-apart relation so as extend continuously from the rear end portions of the respective corresponding magnetic head connecting terminals 20, pass over the main body portion 16A of the slider mounting portion 16 and the wire formation portions 17, and extend continuously to the external connecting terminals 21 (see FIG. 1).

That is, each of the plurality of first signal wires 26 is routed so as to extend over the slider mounting portion 16 and the wire formation portions 17 and includes a mounting region portion 26A as an example of the pedestal conductive layer and an off-mounting-region portion 26B.

The mounting region portion 26A is the portion of each of the first signal wires 26 which is disposed on the slider mounting portion 16. The mounting region portion 26A extends continuously rearwardly from the rear end portion of the corresponding signal terminal 20B and then bends to extend outwardly in the left-right direction.

As shown in FIG. 4, a dimension L3 of the mounting region portion 26A in the widthwise direction perpendicular to the extending direction thereof is in a range of, e.g., not less than 5 μm, or preferably not less than 8 μm and, e.g., not more than 30 μm, or preferably not more than 25 μm. More preferably, the widthwise dimension L3 has the same value as that of the widthwise dimension L1 of the first portion 25A of the ground wire 25.

The widthwise dimension L3 of the mounting region portion 26A is, e.g., not less than 0.5 times, preferably not less than 0.75 times, or more preferably not less than 0.9 times and, e.g., not more than 3 times, preferably not more than 1.5 times, more preferably not more than 1.1 times, or most preferably 1 times the widthwise dimension L1 of the first portion 25A of the ground wire 25.

As shown in FIG. 2, the off-mounting-region portion 26B is the portion of each of the first signal wires 26 which is disposed over the wire formation portion 17. The off-mounting-region portion 26B extends continuously outwardly from the free end portion of the mounting region portion 26A in the left-right direction and then bends rearwardly. After extending so as to successively pass over the first linear portion 17A, the protruding portion 17B, and the second linear portion 17C, the off-mounting-region portion 26B is connected to the corresponding external connecting terminal 21 (see FIG. 1).

As shown in FIG. 1, each of the plurality of first signal wires 26 has the narrower portion 26C where the dimension L2 (an example of a dimension in a wire width direction) in the widthwise direction perpendicular to the extending direction thereof the first signal wire 26 is smallest and a wider portion 26D in which the widthwise dimension L2 is larger than in the narrower portion 26C. The placement of the narrower portion 26C and the wider portion 26D is not particularly limited but, in the present first embodiment, the narrower portion 26C and the wider portion 26D are included in the off-mounting-region portion 26B of the first signal wire 26.

More specifically, as shown in FIG. 2, a plurality of the narrower portions 26C are disposed on the first linear portions 17A of the wire formation portions 17 to be spaced apart from each other in the left-right direction.

As shown in FIG. 3, the widthwise dimension L2 of each of the narrower portions 26C is in a range of, e.g., not less than 5 μm, or preferably not less than 8 μm and, e.g., not more than 30 μm, or preferably not more than 25 μm. More preferably, the widthwise dimension L2 of the narrower portion 26C has the same value as that of the widthwise dimension L1 of the first portion 25A of the ground wire 25.

A spacing L4 between those of the plurality of narrower portions 26C which are adjacent to each other is in a range of, e.g., not less than 5 μm, or preferably not less than 8 μm and, e.g., not more than 30 μm, or preferably not more than 25 μm.

As shown in FIG. 2, a plurality of the wider portions 26D are disposed in parallel on the second linear portions 17C of the wire formation portions 17 to be spaced apart from each other in the left-right direction.

The widthwise dimension of each of the wider portions 26D is in a range of, e.g., not less than 8 μm, or preferably not less than 10 μm and, e.g., not more than 200 μm, or preferably not more than 100 μm.

The plurality of second signal wires 27 are formed so as to extend continuously from the inner end portions of the respective corresponding second terminals 23 in the left-right direction, pass over the slider mounting portion 16 and the wire formation portions 17, and extend continuously to the external connecting terminals 21 (see FIG. 1).

That is, each of the plurality of second signal wires 27 is routed so as to extend over the slider mounting portion 16 and the wire formation portion 17 and includes a pedestal corresponding portion 27A as an example of the pedestal conductive layer and an external terminal connecting portion 27B.

The pedestal corresponding portion 27A is the portion of each of the second signal wires 27 which is disposed on the slider mounting portion 16. The pedestal corresponding portion 27A extends continuously inwardly in the left-right direction from the inner end portion of the corresponding second terminal 23 in the left-right direction and then bends to extend frontwardly.

As shown in FIG. 3, the pedestal corresponding portions 27A are disposed externally of the first portion 25A (specifically, each of the third and fifth linear portions 29C and 29E) of the ground wire 25 in the left-right direction to be spaced apart therefrom.

That is, the first portion 25A of the ground wire 25 and the pedestal corresponding portions 27A of the second signal wires 27 are individually disposed on the both left and right end portions of the main body portion 16A of the slider mounting portion 16 to be spaced apart from each other in the left-right direction.

A dimension L5 of each of the pedestal corresponding portions 27A in the widthwise direction perpendicular to the extending direction thereof is in a range of, e.g., not less than 5 µm, or preferably not less than 8 µm and, e.g., not more than 30 µm, or preferably not more than 25 µn. More preferably, the widthwise dimension L5 has the same value as that of the widthwise dimension L1 of the first portion 25A of the ground wire 25.

The widthwise dimension L5 of each of the pedestal corresponding portions 27A is, e.g., not less than 0.5 times, preferably not less than 0.75 times, or more preferably not less than 0.9 times and, e.g., not more than 3 times, preferably not more than 1.5 times, or more preferably not more than 1.1 times the widthwise dimension L2 of each of the narrower portions 26C.

A distance L6 between the first portion 25A of the ground wire 25 and the pedestal corresponding portion 27A of each of the second signal wires 27 is, e.g., not less than 0.5 times, preferably not less than 0.75 times, or more preferably not less than 0.9 times and, e.g., not more than 3 times, preferably not more than 1.5 times, or more preferably not more than 1.1 times the widthwise dimension L2 of the first portion 25A.

As shown in FIG. 2, the external terminal connecting portion 27B is the portion of each of the second signal wires 27 which is disposed on the wire formation portion 17. The external terminal connecting portion 27B is bent continuously from the free end portion of the pedestal corresponding portion 27A in such a manner as to make a U-turn. After successively passing over the first linear portion 17A, the protruding portion 17B, and the second linear portion 17C, the external terminal connecting portion 27B is connected to the corresponding external connecting terminal 21 (see FIG. 1).

Note that the external terminal connecting portions 27B are disposed on the wire formation portions 17 to be internally spaced apart from the off-mounting-region portions 26B of the first signal wires 26 in the left-right direction.

The conductive pattern 7 is formed of a conductive material such as, e.g., copper, nickel, gold, a solder, or an alloy thereof. Preferably, the conductive pattern 7 is formed of copper. The thickness of the conductive pattern 7 is in a range of, e.g., not less than 1 µm, or preferably not less than 3 µm and, e.g., not more than 20 µm, or preferably not more than 12 µm.

As shown in FIGS. 3 and 4, the insulating cover layer 8 is laminated (placed) on the upper surface of the insulating base layer 6 so as to cover the conductive pattern 7 from above. Specifically, the insulating cover layer 8 includes a front end cover not shown, a mounting region cover 31 as an example of a pedestal cover layer, and a plurality of (two) wire covers 32.

The front end cover not shown is formed on the first terminal formation portion 15 so as to expose the front-side portions of the magnetic head connecting terminals 20 and the first terminals 22.

The mounting region cover 31 is formed over the slider mounting portion 16. The front end portion of the mounting region cover 31 is connected to the generally middle of the rear end portion of the front end cover not shown in the left-right direction. The mounting region cover 31 exposes the second terminals 23 and covers the rear-side portions of the magnetic head connecting terminals 20, the first portion 25A of the ground wire 25, the mounting region portions 26A of the first signal wires 26, and the pedestal corresponding portions 27A of the second signal wires 27. That is, the mounting region cover 31 is disposed over the first portion 25A of the ground wire 25 and the pedestal corresponding portions 27A of the second signal wires 27.

In the mounting region cover 31, a cover opening 31A is formed to communicate with the opening 16C of the slider mounting portion 16 in the upper-lower direction. The cover opening 31A has the same shape and size as those of the opening 16C and extends through the mounting region cover 31 in the upper-lower direction.

As shown in FIG. 3, the plurality of wire covers 32 are disposed on the respective corresponding wire formation portions 17. The front end portions of the wire covers 32 are continued to the both left and right end portions of the front cover not shown and are also continued to the front end portion of the mounting region cover 31.

The plurality of wire covers 32 expose the external connecting terminals 21 (see FIG. 1) and cover the second portion 25B of the ground wire 25, the off-mounting-region portions 26B of the first signal wires 26, and the external terminal connecting portions 27B of the second signal wires 27.

The insulating cover layer 8 is formed of the same synthetic resin as forming the insulating base layer 6. Preferably, the insulating cover layer 8 is formed of polyimide. The thickness of the insulating cover layer 8 is in a range of, e.g., not less than 1 µm, or preferably not less than 3 µm and, e.g., not more than 20 µm, or preferably not more than 12 µm.

As shown in FIG. 2, the suspension board with circuit 1 includes a slider mounting region 40 for mounting the slider 60.

As shown in FIGS. 3 and 4, the slider mounting region 40 includes (consists of) the reinforcing portion 13, the slider mounting portion 16, the conductive pattern 7 (the rear-side portions of the magnetic head connecting terminals 20, the first portion 25A of the ground wire 25, the mounting region portions 26A of the first signal wires 26, and the pedestal corresponding portions 27A of the second signal wires 27) disposed on the slider mounting portion 16, and the mounting region cover 31. That is, the narrower portions 26C of the first signal wires 26 are disposed outside the slider mounting region 40.

The slider mounting region 40 also includes a pedestal 41 for supporting the slider 60.

The pedestal 41 includes the slider mounting portion 16, the first portion 25A of the ground wire 25, the mounting region portions 26A of the first signal wires 26, the pedestal corresponding portions 27A of the second signal wires 27, and the mounting region cover 31. Note that, in the first embodiment, the pedestal 41 is made only of a thin pedestal portion.

On the suspension board with circuit 1, the slider 60 and a plurality of (two) piezoelectric elements 59 are mounted.

The slider 60 is formed in a generally flat plate shape having a thickness in the upper-lower direction. As shown in FIG. 4, the slider 60 includes a plurality of slider terminals 61 electrically connected to the magnetic head not shown. The plurality of slider terminals 61 correspond to the plurality of magnetic head connecting terminals 20. The same number of slider terminals 61 as that of the plurality of magnetic head connecting terminals 20 are provided.

To mount the slider 60 on the suspension board with circuit 1, the slider 60 is mounted on the slider mounting region 40 from above. In a state where the slider 60 is mounted on the slider mounting region 40, the mounting region cover 31 of the pedestal 41 is brought into contact with the peripheral edge portion of the lower surface of the slider 60 from below, as shown in FIGS. 3 and 4. Thus, the slider 60 is supported on the pedestal 41.

Note that, to the center portion of the lower surface of the slider 60, a known adhesive has been applied in advance, though not shown. In the state where the slider 60 is mounted on the slider mounting region 40, the slider 60 is bonded to the upper surface of the rectangular portion 13A of the reinforcing portion 13 through the opening 16C of the slider mounting portion 16 and the cover opening 31A of the mounting region cover 31 with an adhesive.

Then, each of the plurality of slider terminals 61 and the front-side portion of the corresponding magnetic head connecting terminal 20 are connected with a bonding member 62 such as a solder.

Thus, an operation of mounting the slider 60 on the slider mounting region 40 of the suspension board with circuit 1 is completed.

As shown in FIG. 3, each of the plurality of piezoelectric elements 59 is an actuator which is expandable/contractible in the front-rear direction. To the piezoelectric element 59, electricity is supplied, and the voltage thereof is controlled to thereby expand/contract the piezoelectric element 59. The piezoelectric element 59 is formed of, e.g., BaTiO$_3$ (barium titanate), PbTiO$_3$ (lead titanate), Pb(Zr, Ti)O$_3$ (lead zirconate titanate), or the like. The piezoelectric element 59 includes first and second element terminals not shown.

To mount the plurality of piezoelectric elements 59 on the suspension board with circuit 1, the plurality of piezoelectric elements 59 are disposed to be spaced apart from each other in the left-right direction such that the slider 60 is interposed therebetween. At this time, the first element terminals not shown face the first terminals 22 in the upper-lower direction, and the second element terminals not shown face the second terminals 23 in the upper-lower direction.

Then, the first element terminals not shown and the first terminals 22 are connected and the second element terminals not shown and the second terminals 23 are connected with a bonding member such as a solder.

Thus, the operation of mounting the plurality piezoelectric elements 59 on the suspension board with circuit 1 is completed.

In the suspension board with circuit 1, the widthwise dimension L1 of the first portion 25A of the ground wire 25 is 0.5 to 3 times the widthwise dimension L2 of the narrower portion 26C of each of the first signal wires 26, as shown in FIG. 3. Accordingly, the ratio of the thickness of the mounting region cover 31 covering the first portion 25A to the thickness of each of the wire covers 32 covering the narrower portions 26C falls within a predetermined range.

As a result, even when the thickness of the insulating cover layer 8 is set on the basis of the thickness of the portion thereof covering the narrower portion 26C, it is possible to inhibit the thickness of the mounting region cover 31 from significantly deviating from the set value of the thickness of the insulating cover layer 8.

This allows the narrower portions 26C of the first signal wires 26 to be reliably covered and also allows an improvement in the accuracy of the position of the slider 60 in the upper-lower direction.

As shown in FIG. 2, the narrower portions 26C of the first signal wires 26 are disposed outside the slider mounting region 40 to be spaced apart from the pedestal corresponding portions 27A of the second signal wires 27 in the left-right direction. That is, the narrower portions 26C of the first signal wires 26 are disposed in the vicinity of the slider mounting region 40 (in the mounting portion 2).

Accordingly, in the suspension board with circuit 1, it is possible to save space around the slider mounting region 40 and consequently reduce the size of the mounting portion 2.

The first portion 25A and the pedestal corresponding portions 27A which are included in the pedestal 41 are used respectively as apart of the ground wire 25 and also as parts of the second signal wires 27. Accordingly, it is possible to ensure efficient placement of the first portion 25A of the ground wire 25 and the pedestal corresponding portions 27A of the second signal wires 27 and effectively use space.

As shown in FIG. 2, the ground wire 25 is grounded to the supporting board 5. As a result, even when the first portion 25A of the ground wire 25 is electrically affected by the slider 60, it is possible to inhibit the operation of the suspension board with circuit 1 from being affected thereby.

As shown in FIG. 3, the first portion 25A of the ground wire 25 and the pedestal corresponding portions 27A of the second signal wires 27 are arranged in parallel to be spaced apart from each other in the left-right direction. This allows the pedestal 41 to more stably support the slider 60.

2. Second Embodiment

Next, referring to FIGS. 5 to 7B, a second embodiment of the present invention is described. Note that, in the second embodiment, the same members as those in the first embodiment described above are designated by the same reference numerals and a description thereof is omitted.

Figure 7A:
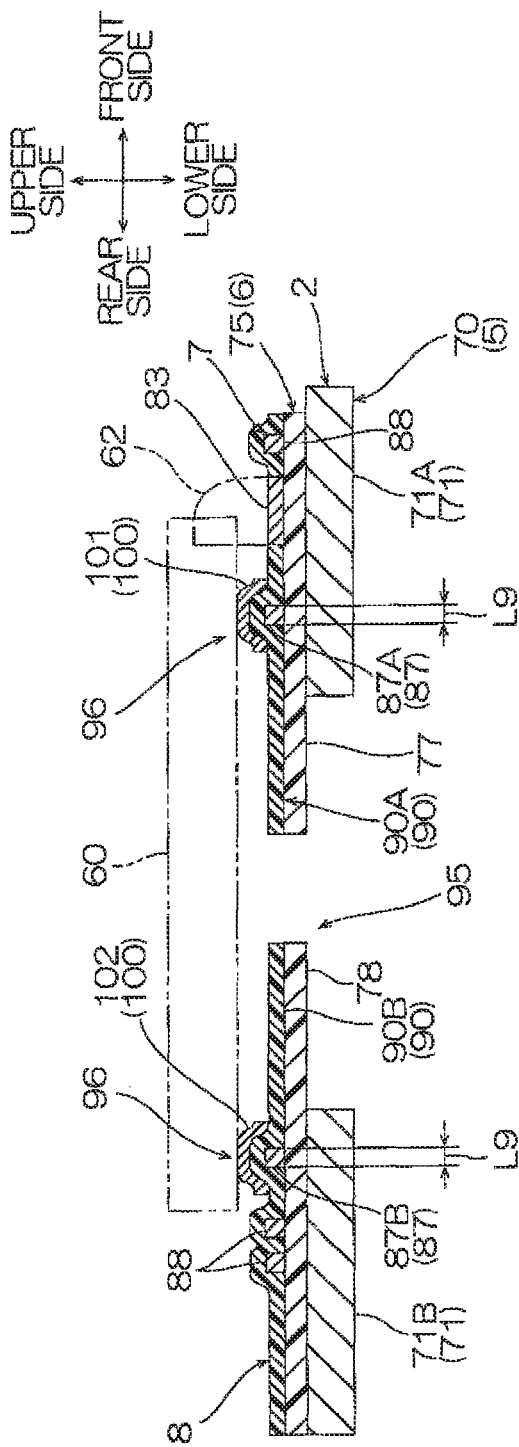
FIG. 7A is a C-C cross-sectional view of the mounting portion shown in FIG. 5.
Figure 7C:
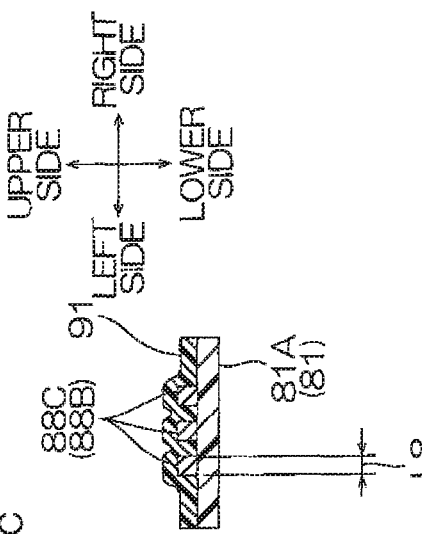
FIG. 7C is an E-E cross-sectional view of the narrower portion of each of the first signal wires shown in FIG. 5.
Figure 7B:
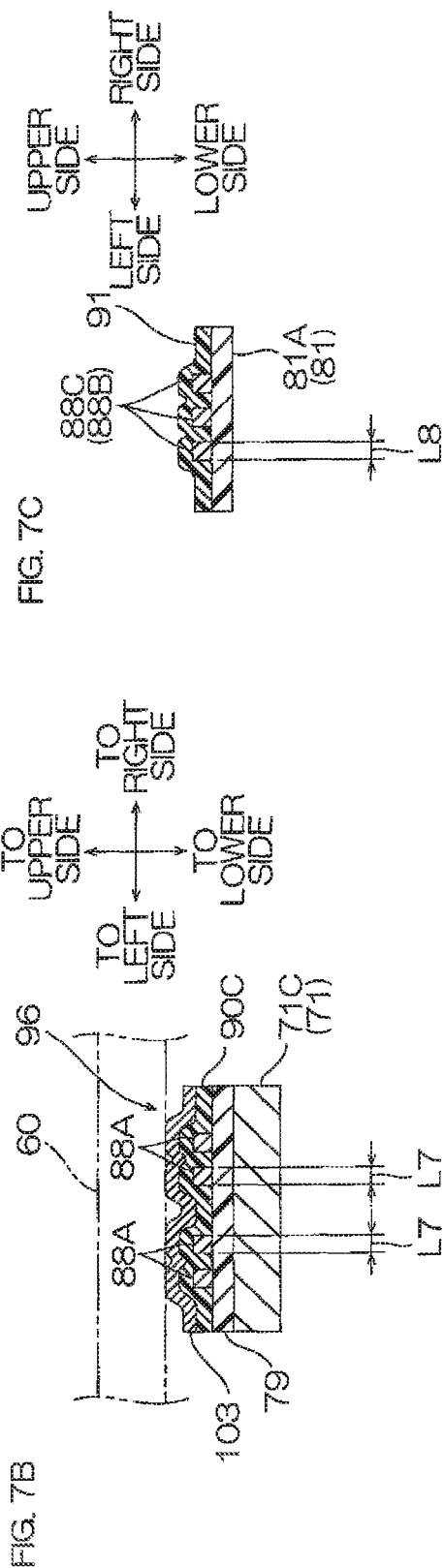
FIG. 7B is a D-D cross-sectional view of the middle supporting portion shown in FIG. 5.

In the first embodiment, as shown in FIG. 4, the suspension board with circuit 1 includes the supporting board 5, the insulating base layer 6, the conductive pattern 7, and the insulating cover layer 8. On the other hand, in the second embodiment, as shown in FIGS. 7A to 7C, the suspension board with circuit 1 further includes a supporting layer 100 in addition to the supporting board 5, the insulating base layer 6, the conductive pattern 7, and the insulating cover layer 8.

In the second embodiment, as shown in FIG. 6, the supporting board 5 includes a gimbal portion 70 corresponding to the mounting portion 2.

The gimbal portion 70 is the front end portion of the supporting board 5 and includes a supporting portion 71, a pair of outrigger portions 73, and a pair of connecting portions 72.

The supporting portion 71 has a generally H-shaped shape in plan view and includes a front-side portion 71A, a rear-side portion 71B, and a bridge portion 71C.

The front-side portion 71A is formed in a generally rectangular shape in plan view extending in the left-right direction.

The rear-side portion 71B is disposed to be rearwardly spaced apart from the front-side portion 71A and is formed in a generally rectangular shape in plan view extending in the left-right direction.

The bridge portion 71C is disposed between the front-side portion 71A and the rear-side portion 71B and is formed in a generally rectangular shape in plan view extending in the front-rear direction. The bridge portion 71C connects the generally middle portion of the rear end edge of the front-side portion 71A in the left-right direction and the generally middle portion of the front end edge of the rear-side portion 71B in the left-right direction.

The pair of outrigger portions 73 are arranged to be spaced apart from each other in the left-right direction such that the supporting portion 71 is interposed therebetween. Each of the pair of outrigger portions 73 is formed in a generally rectangular shape in plan view extending in the front-rear direction. The front end portion of each of the outrigger portions 73 is disposed to be externally spaced apart from the front-side portion 71A of the supporting portion 71 in the left-right direction. Note that the rear end portion of each of the outrigger portions 73 is connected to the front end portion of the wire supporting portion 11, though not shown.

The pair of connecting portions 72 connect the both left and right end portions of the rear-side portion 71B of the supporting portion 71 and the front end portions of the pair of outrigger portions 73. Each of the pair of connecting portions 72 extends continuously from the both left and right end edges of the rear-side portion 71B of the supporting portion 71 and outwardly in the left-right direction with approach to the front side. The pair of connecting portions 72 are connected to the inner end edges of the front end portions of the pair of outrigger portions 73 in the left-right direction.

The insulating base layer 6 includes a slider mounting portion 75 as an example of a pedestal base layer, a pair of wire formation portions 76, and a supporting/connecting portion 82.

The slider mounting portion 75 corresponds to the supporting portion 71 and includes a first terminal formation portion 77, a second terminal formation portion 78, and a base bridge portion 79.

The first terminal formation portion 77 is a front-side portion of the slider mounting portion 75 which is formed in a generally rectangular shape in plan view extending in the left-right direction. The front-side portion of the first terminal formation portion 77 is disposed on the front-side portion 71A of the supporting portion 71, while the rear-side portion of the first terminal formation portion 77 is disposed on the rear side of the front-side portion 71A. In the first terminal formation portion 77, a plurality of (two) through holes 77A are formed.

The plurality of through holes 77A are disposed in the rear side portion of the first terminal formation portion 77 to be located on the rear side of the front-side portion 71A of the supporting portion 71. The plurality of through holes 77A are disposed to be spaced apart from each other in the left-right direction so as to be located on both left and right sides of the bridge portion 71C when viewed from above. Each of the plurality of through holes 77A is formed in a generally rectangular shape in plan view to extend through the first terminal formation portion 77 in the upper-lower direction.

The second terminal formation portion 78 is the rear-side portion of the slider mounting portion 75 which is disposed on the rear side of the first terminal formation portion 77 to be spaced apart therefrom. The second terminal formation portion 78 is formed in a generally rectangular shape extending in the left-right direction. The rear-side portion of the second terminal formation portion 78 is disposed on the rear-side portion 71B of the supporting portion 71. The front-side portion of the second terminal formation portion 78 is disposed on the front side of the rear-side portion 71B. In the second terminal formation portion 78, a plurality of (two) through holes 78A are formed.

The plurality of through holes 78A are disposed in the front-side portion of the second terminal formation portion 78 to be located on the front side of the rear-side portion 71B of the supporting portion 71. The plurality of through holes 78A are disposed to be spaced apart from each other in the left-right direction so as to be located on both left and right sides of the bridge portion 71C when viewed from above. Each of the plurality of through holes 78A is formed in a generally rectangular shape in plan view to extend through the second terminal formation portion 78 in the upper-lower direction.

The base bridge portion 79 is disposed on the bridge portion 71C between the first and second terminal formation portions 77 and 78. The base bridge portion 79 is formed in a generally rectangular shape in plan view. The base bridge portion 79 connects the generally middle portion of the rear end edge of the first terminal formation portion 77 in the left-right direction and the generally middle portion of the front end edge of the second terminal formation portion 78 in the left-right direction.

The pair of wire formation portions 76 are disposed to be spaced apart from each other in the left-right direction such that the second terminal formation portion 78 is interposed therebetween. Each of the pair of wire formation portions 76 includes a base connecting portion 80 and a base linear portion 81.

The base connecting portions 80 are disposed on the respective rear-side portions of the corresponding connecting portions 72. The inner end edges of the base connecting portions 80 in the left-right direction are connected to the end edges of the second terminal formation portion 78 in the left-right direction.

Each of the base linear portions 81 is disposed externally of the base connecting portion 80 in the left-right direction and has a front-side portion 81 IA and a rear portion not shown.

The front-side portions 81A are disposed to be inwardly spaced apart from the outrigger portions 73 in the left-right direction. Each of the front-side portions 81A is formed in a flat belt shape extending in the front-rear direction. The front end portion of the front-side portion 81A is connected to the front end portion of the base connecting portion 80.

The rear portions not shown extend continuously rearwardly from the rear end portions of the front-side portions 81A. The rear portions not shown are disposed over the wire supporting portion 11 and the connecting board portion 9 (see FIG. 1).

The supporting/connecting portion 82 has flexibility and connects the front-side portion 71A of the supporting portion 71 and the pair of outrigger portions 73.

The supporting/connecting portion 82 includes a pair of curved portions 82A which curvedly connect the front end portions of the pair of outrigger portions 73 and the both left and right end portions of the front-side portion 71A of the supporting portion 71 and an E-shaped portion 82B connecting the front end portions of the pair of outrigger portions 73 and the front end portion of the front-side portion 71A of the supporting portion 71.

The curved portions 82A curvedly extend from the front end portions of the outrigger portions 73 obliquely inwardly in the left-right direction toward the front side to reach the end portions of the front-side portion 71A in the left-right direction.

The E-shaped portion 82B is formed in a generally E-shaped shape in plan view. Specifically, the linear portions of the E-shaped portion 82B along the front-rear direction extend from the front ends of the two outrigger portions 73 toward the front side and then bend inwardly in the left-right direction. After extending inwardly in the left-right direction, the linear portions of the E-shaped portion 82B along the left-right direction are united to bend rearwardly and reach the generally middle of the front end portion of the front-side portion 71A in the left-right direction.

The conductive pattern 7 includes the plurality of (four) magnetic head connecting terminals 83, a plurality of (two) first terminals 84, a plurality of (two) second terminals 85, a plurality of (six) wires 86, and a plurality of (four) pedestal wires 87 as an example of the pedestal conductive layer.

The plurality of magnetic head connecting terminals 83 are disposed in parallel on the front-side portion of the first terminal formation portion 77 to be spaced apart from each other in the left-right direction. Each of the plurality of magnetic head connecting terminals 83 is formed in a generally rectangular shape in plan view extending in the front-rear direction.

The plurality of first terminals 84 are disposed on the rear-side portion of the first terminal formation portion 77 to be spaced apart from each other in the left-right direction. Each of the plurality of first terminals 84 is formed in a generally rectangular shape in plan view to fill the pair of respective through holes 77A. As a result, the first terminals 84 are exposed through the through holes 77A to face downwardly.

The plurality of second terminals 85 are disposed on the front-side portion of the second terminal formation portion 78 to be spaced apart from each other in the left-right direction. Each of the plurality of second terminals 85 is formed in a generally rectangular shape in plan view to fill the pair of respective through holes 78A. As a result, the second terminals 85 are exposed through the through holes 78A to face downwardly.

The plurality of wires 86 include a plurality of (four) first signal wires 88 as an example of the first wire and a plurality of (two) second signal wires 89.

The plurality of first signal wires 88 are formed to be spaced apart from each other so as to extend continuously from the front end portions of the corresponding magnetic head connecting terminals 83, pass over the slider mounting portion 75 and the wire formation portion 76, and extend continuously to the external connecting terminals 21 (see FIG. 1).

Specifically, each of the plurality of first signal wires 88 includes a mounting region portion 88A as an example of the pedestal conductive layer and an off-mounting-region portion 88B.

The mounting region portion 88A is the portion of each of the first signal wires 88 which is located on the slider mounting portion 75. The mounting region portion 88A extends continuously inwardly from the front end portion of the corresponding magnetic head connecting terminal 83 in the left-right direction and then bends rearwardly to extend to the rear end portion of the second terminal formation portion 78 in such a manner as to pass over the base bridge portion 79. Then, the mounting region portion 88A extends outwardly in the left-right direction to the both end portions of the second terminal formation portion 78 in the left-right direction.

As shown in FIG. 7B, the range of widthwise dimensions L7 of the mounting region portions 88A is the same as, e.g., the range of the widthwise dimension L1 (see FIG. 3) of the first portion 25A in the first embodiment.

The widthwise dimension L7 of the mounting region portion 88A is, e.g., not less than 0.5 times, preferably not less than 0.75 times, or more preferably not less than 0.9 times and, e.g., not more than 3 times, preferably not more than 1.5 times, more preferably not more than 1.1 times, or most preferably 1 times a widthwise dimension L8 of each of narrower portions 88C described later.

As shown in FIG. 6, the off-mounting-region portion 88B is the portion of each of the first signal wires 88 which is located on the wire formation portion 76. The off-mounting-region portion 88B extends continuously from the free end portion of the mounting region portion 88A over the base connecting portion 80 and outwardly in the left-right direction with approach to the front side. The off-mounting-region portion 88B is then bent in such a manner as to make a U-turn to rearwardly extend over the base linear portion 81 (see FIG. 1).

As shown in FIG. 7C, the off-mounting-region portion 88B has the narrower portions 88C where the widthwise dimension L8 is smallest and wider portions (not shown) where the widthwise dimension L8 is larger than in the narrower portions 88C (not shown).

The plurality of narrower portions 88C are disposed in parallel on the front-side portion 81A of the base linear portion 81 to be spaced apart from each other in the left-right direction. The range of the widthwise dimensions L8 of the narrower portions 88C is the same as, e.g., the range of the widthwise dimensions L2 of the narrower portion 26C in the first embodiment.

The plurality of wider portions (not shown) are disposed in parallel on the rear portion (not shown) of the base linear portion 81 to be spaced apart from each other in the left-right direction, though not shown (see FIG. 1). The range of the widthwise dimensions L8 of the wider portions (not shown) is the same as, e.g., the range of the widthwise dimensions of the wider portion 26D in the first embodiment.

As shown in FIG. 6, the plurality of second signal wires 89 are formed so as to extend continuously from the outer end portions of the corresponding second terminals 85 in the left-right direction, pass over the base connecting portion 80 and the base linear portion 81, and extend continuously to the external connecting terminals 21 (see FIG. 1).

The plurality of pedestal wires 87 include a pair of front-side pedestal wires 87A and a pair of rear-side pedestal wires 87B.

The pair of front-side pedestal wires 87A are placed on the first terminal formation portion 77 to be spaced apart from each other in the left-right direction such that the mounting region portions 88A of the plurality of first signal wires 88 are interposed therebetween. Each of the pair of front-side pedestal wires 87A linearly extends in the left-right direction and is placed between the magnetic head connecting terminals 83 and the first terminal 84 in the front-rear direction to be spaced apart therefrom.

The pair of rear-side pedestal wires 87B are placed on the second terminal formation portion 78 to be spaced apart from each other in the left-right direction such that the mounting region portions 88A of the plurality of first signal wires 88 are interposed therebetween. Each of the pair of rear-side pedestal wires 87B linearly extends in the left-right direction and is placed on the rear side of the second terminal 85 in the front-rear direction to be spaced apart therefrom.

As shown in FIG. 7A, the range of the widthwise dimensions L9 (dimensions L9 in the front-rear direction) of the plurality of pedestal wires 87 is the same as, e.g., the range of the widthwise dimensions L1 of the first portion 25A in the first embodiment.

The widthwise dimension L9 of each of the pedestal wires 87 is, e.g., not less than 0.5 times, preferably not less than 0.75 times, or more preferably not less than 0.9 times and, e.g., not more than 3 times, preferably not more than 1.5 times, more preferably not more than 1.1 times, and most preferably 1 times the widthwise dimension L8 of each of the narrower portions 88C.

Figure 5:
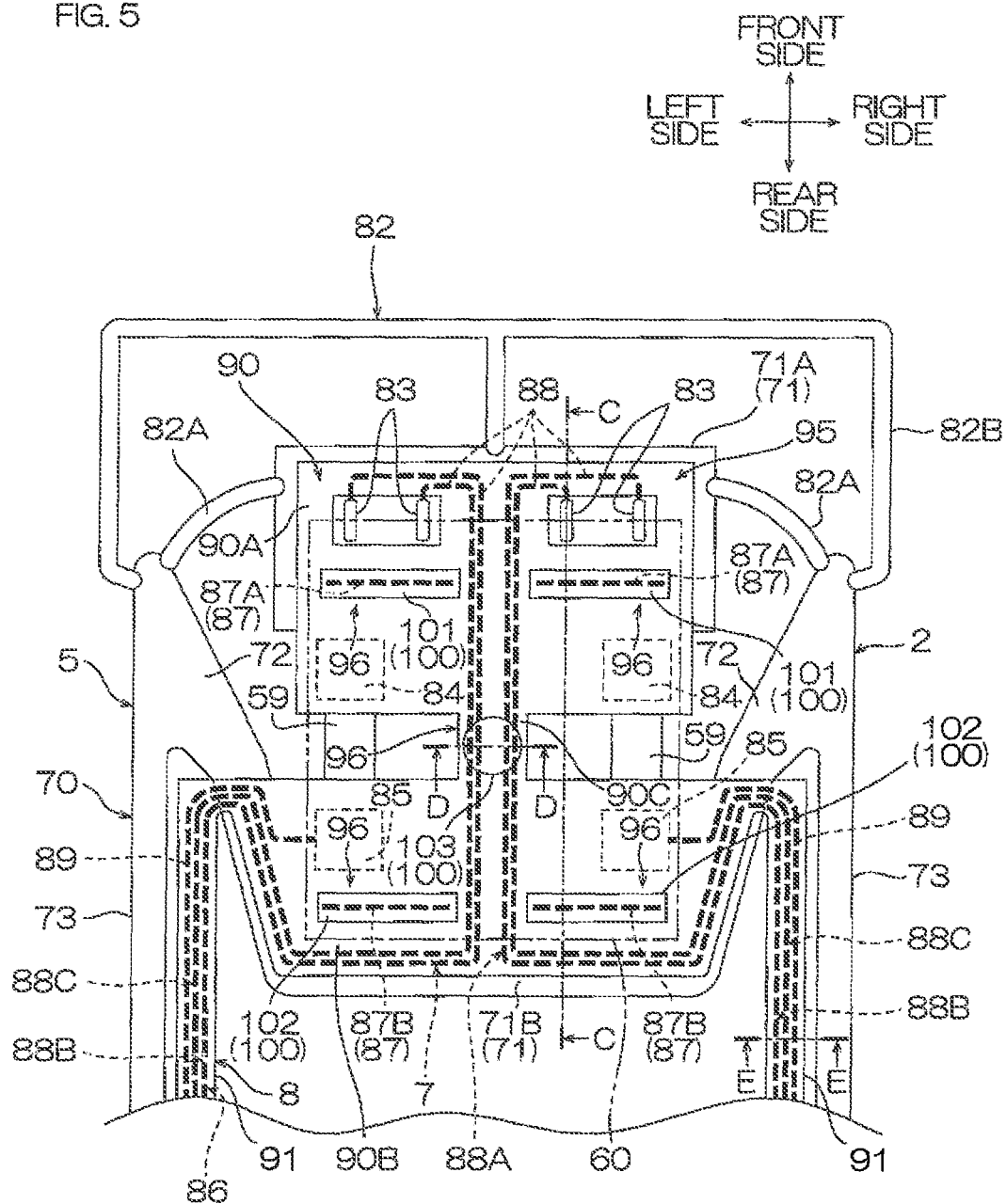
FIG. 5 is a plan view of a mounting portion associated with a suspension board with circuit as a second embodiment of the present invention.

As shown in FIG. 5, the insulating cover layer 8 includes a mounting region cover 90 as an example of a pedestal cover layer and a plurality of (two) wire covers 91.

The mounting region cover 90 is formed on the slider mounting portion 75 and has a front-side cover 90A, a rear-side cover 90B, and a cover bridge portion 90C.

As shown in FIG. 7A, the front-side cover 90 is the front-side portion of the mounting region cover 90 which is disposed on the first terminal formation portion 77 of the slider mounting portion 75. As shown in FIG. 5, the front-side cover 90A has generally the same shape and size as those of the first terminal formation portion 77 when viewed in the upper-lower direction. The front-side cover 90A exposes the magnetic head connecting terminals 83 and covers the plurality of first terminals 84, the front-side portions of the mounting region portions 88A of the plurality of first signal wires 88, and the pair of front-side pedestal wires 87A.

As shown in FIG. 7A, the rear-side cover 90B is the rear-side portion of the mounting region cover 90 which is disposed on the second terminal formation portion 78 of the slider mounting portion 75. As shown in FIG. 5, the rear-side cover 90B has generally the same shape and size as those of the second terminal formation portion 78 when viewed in the upper-lower direction. The rear-side cover 90B covers the plurality of second terminals 85, the rear-side portions of the mounting region portions 88A of the plurality of first signal wires 88, and the pair of rear-side pedestal wires 87B.

Between the front-side cover 90A and the rear-side cover 90B, the cover bridge portion 90C is disposed on the base bridge portion 79. The cover bridge portion 90C connects the generally middle portion of the rear end edge of the front-side cover 90A in the left-right direction and the generally middle portion of the front end edge of the rear-side cover 90B in the left-right direction.

The plurality of wire covers 91 are disposed on the corresponding wire formation portions 76. The front end portions of the wire covers 91 are continued to the both left and right end portions of the rear end portion of the mounting region cover 90. The plurality of wire covers 91 cover the respective off-mounting-region portions 88B of the first signal wires 88 as well as the second signal wires 89.

As shown in FIGS. 7A and 7B, the supporting layer 100 is disposed on the mounting region cover 90. As shown in FIG. 5, the supporting layer 100 includes a pair of front-side supporting portions 101, a pair of rear-side supporting portions 102, and a middle supporting portion 103.

The pair of front-side supporting portions 101 correspond to the pair of front-side pedestal wires 87A and are disposed on the front-side cover 90A. The pair of front-side supporting portions 101 are disposed to be spaced apart from each other in the left-right direction so as to overlap the pair of front-side pedestal wires 87A when viewed from above. Specifically, each of the pair of front-side supporting portions 101 is formed in a generally rectangular shape in plan view extending in the left-right direction and disposed so as to include the entire corresponding front-side pedestal wire 87A when projected in the upper-lower direction.

The pair of rear-side supporting portions 102 correspond to the pair of rear-side pedestal wires 87B and are disposed on the rear-side cover 90B. The pair of rear-side supporting portions 102 are disposed to be spaced apart from each other in the left-right direction so as to overlap the pair of rear-side pedestal wires 87B when viewed from above. Specifically, each of the pair of rear-side supporting portions 102 is formed in a generally rectangular shape in plan view extending in the left-right direction and disposed so as to include the entire corresponding rear-side pedestal wire 87B when projected in the upper-lower direction.

The middle supporting portion 103 is disposed on the cover bridge portion 90C. The middle supporting portion 103 is formed in a generally circular shape in plan view and disposed so as to overlap the middle portions of the mounting region portions 88A of the plurality of first signal wires 88 in the front-rear direction when projected in the upper-lower direction.

The suspension board with circuit 1 includes a slider mounting region 95 for mounting the slider 60.

As shown in FIG. 7A, the slider mounting region 95 includes (consists of) the supporting portion 71, the slider mounting portion 75, the conductive pattern 7 (the plurality of magnetic head connecting terminals 83, the mounting region portions 88A of the plurality of first signal wires 88, and the plurality of pedestal wires 87) disposed on the slider mounting portion 75, the mounting region cover 90, and the supporting layer 100.

The slider mounting region 95 also includes a pedestal 96 for supporting the slider 60.

The pedestal 96 includes the slider mounting portion 75, the mounting region portions 88A of the plurality of first signal wires 88, the plurality of pedestal wires 87, the mounting region cover 90, and the supporting layer 100. Note that, in the second embodiment, the pedestal 96 is made only of thin pedestal portion.

In the suspension board with circuit 1 according to the second embodiment, the slider 60 is mounted on the upper side of the slider mounting region 95, while the plurality of piezoelectric elements 59 are mounted on the lower side of the slider mounting region 95.

In a state where the slider 60 is mounted on the slider mounting region 95, each of the pair of front-side supporting portions 101 is brought into contact with the front end portion of the lower surface of the slider 60 from below, while each of the pair of rear-side supporting portions 102 is brought into contact with the rear end portion of the lower surface of the slider 60 from below. As shown in FIG. 7B, the middle supporting portion 103 is brought into contact with the generally middle portion of the lower surface of the slider 60 from below. In this manner, the slider 60 is supported on the pedestals 96.

As shown in FIG. 6, the plurality of piezoelectric elements 59 are disposed between the front-side portion 71A and the rear-side portion 71B of the supporting portion 71 to be spaced apart from each other in the left-right direction such that the bridge portion 71C is interposed therebetween.

In a state where each of the plurality of piezoelectric elements 59 is mounted on the slider mounting region 95, the first element terminals not shown are placed under the first terminals 84 and the second element terminals not shown are placed under the second terminals 85.

In such a second embodiment, as shown in FIGS. 7A to 7C, the widthwise length L9 of each of the pedestal wires 87 is 0.5 to 3 times the widthwise dimension L8 of each of the narrower portions 88C of the first signal wires 88. Accordingly, the ratio of the thickness of the mounting region cover 90 over the pedestal wire 87 to the thickness of the wire cover 91 over the narrower portion 88C falls within a predetermined range.

As a result, even when the thickness of the insulating cover layer 8 is set on the basis of the thickness of the portion thereof covering the narrower portion 88C, it is possible to inhibit the thickness of the mounting region cover 90 from significantly deviating from the set value of the thickness of the insulating cover layer 8.

This allows an improvement in the accuracy of the thickness of the mounting region cover 90. Accordingly, even when the supporting layer 100 is disposed on the mounting cover 90, it is possible to improve the accuracy of the position of the slider 60 in the upper-lower direction.

Therefore, even the second embodiment can achieve the same function/effect as achieved by the first embodiment described above.

3. Third Embodiment

Figure 8:
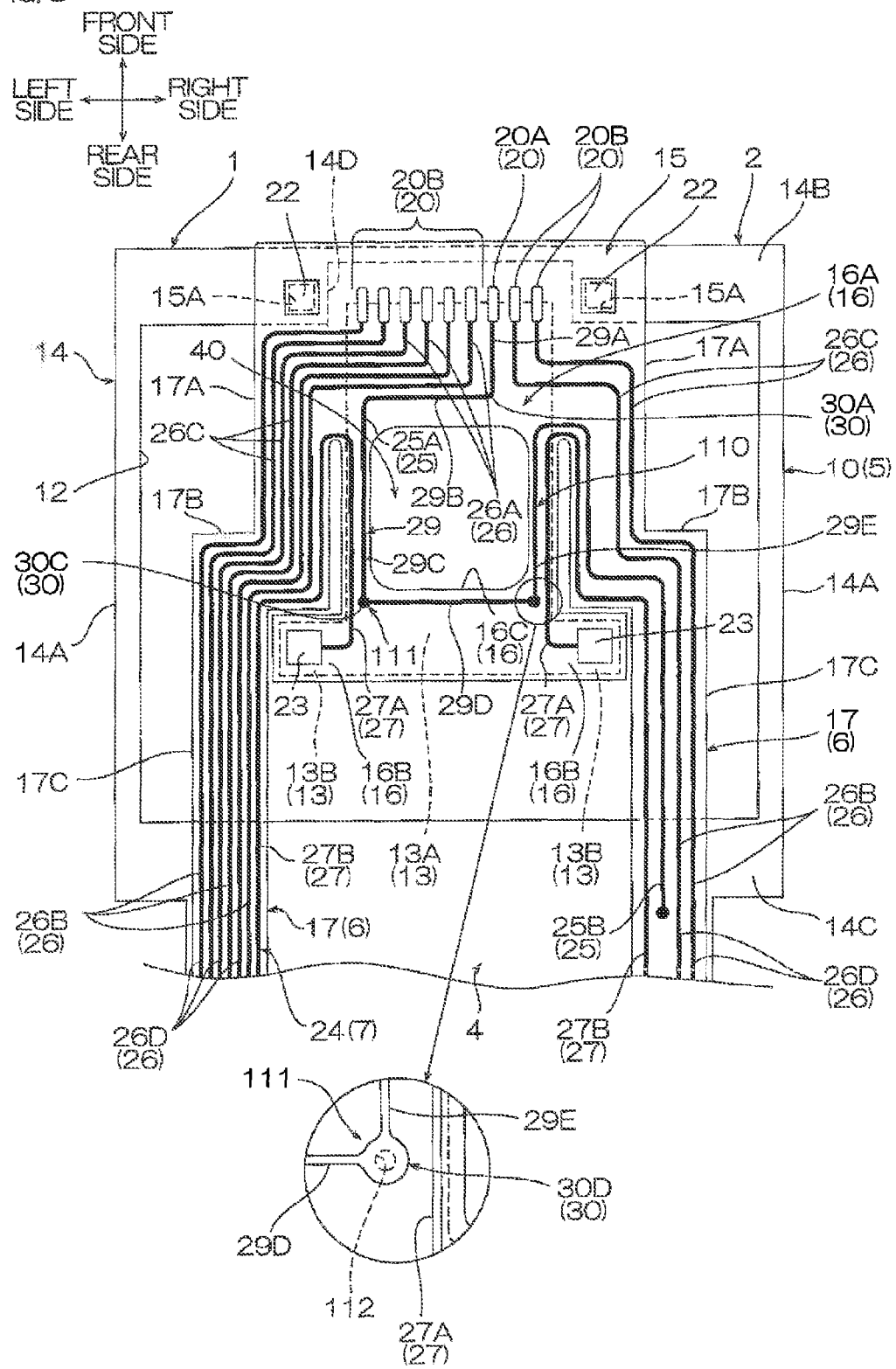
FIG. 8 is a plan view of a mounting portion associated with a suspension board with circuit as a third embodiment of the present invention.

Next, referring to FIG. 8, a third embodiment of the present invention is described. Note that, in the third embodiment, the same members as those in the first embodiment described above are designated by the same reference numerals and a description thereof is omitted.

In the first embodiment, the pedestal 41 is made only of the thin pedestal portion. By contrast, in the third embodiment, as shown in FIG. 8, the pedestal 41 includes thin pedestal portions 110 and thick pedestal portions 111.

In the third embodiment, in the main body portion 16A of the slider mounting portion 16, a plurality of (two) ground openings 112 are formed.

The plurality of ground openings 112 are formed in the portions of the main body portion 16A which correspond to the third and fourth corner portions 30C and 30D of the ground wire 25.

The plurality of ground openings 112 are arranged to be spaced apart from each other in the left-right direction. Each of the plurality of ground openings 112 is formed in a generally circular shape in plan view to extend through the main body portion 16A in the upper-lower direction.

Each of the third and fourth corner portions 30C and 30D of the ground wire 25 is formed in a generally circular shape in plan view. The respective center portions of the third and fourth corner portions 30C and 30D fill the plurality of ground openings 112. Thus, each of the third and fourth corner portions 30C and 30D extends through the main body portion 16A in the upper-lower direction to come in contact with the upper surface of the rectangular portion 13A exposed in the ground opening 112.

The pedestal 41 in the third embodiment includes the thin pedestal portions 110 and the thick pedestal portions 111.

The thin pedestal portions 110 include (consists of) the slider mounting portion 16, the first portion 25A (except for the third and fourth corner portions 30C and 30D) of the ground wire 25, the mounting region portions 26A of the first signal wires 26, the pedestal corresponding portions 27A of the second signal wires 27, and the mounting region cover 31.

The thick pedestal portions 111 include (consists of) the slider mounting portion 16, the third and fourth corner portions 30C and 30D of the ground wire 25, the mounting region portions 26A of the first signal wires 26, the pedestal corresponding portions 27A of the second signal wires 27, and the mounting region cover 31. That is, the major parts of the pedestal 41 are configured as the thin pedestal portions 100, while parts of the pedestal 41 are configured as the thick pedestal portions 111.

In a state where the slider 60 is mounted on the slider mounting region 95, of the four corners of the slider 60, the rear two corners (i.e., the left rear and right rear corners) are supported by the thick pedestal portions 111 from below, while the peripheral edges of the lower surface of the slider 60 except for the rear two corners are supported by the thin pedestal portions 110.

In the third embodiment described above, as shown in FIG. 8, the thin pedestal portions 110 as the major parts of the pedestal 41 include the plurality of linear portions 29. As shown in FIG. 3, the widthwise dimension L1 of each of the plurality of linear portions 29 is 0.5 to 3 times the widthwise dimension L2 of each of the narrower portions 26C of the first signal wires 26. Accordingly, the ratio of the thickness of the mounting region cover 31 over each of the linear portions 29 to the thickness of each of the wire covers 32 over the narrower portions 26C falls within a predetermined range.

As a result, it is possible to improve the accuracy of the thickness of the mounting region cover 31 over each of the linear portions 29, especially the thickness of the mounting region cover 31 over each of the second, third, fourth, and fifth linear portions 29B, 29C, 29D, and 29E.

This allows the front, left, rear, and right peripheral edges of the lower surface of the slider 60 to be accurately supported and allows an improvement in the accuracy of the position of the slider 60 in the upper-lower direction.

Therefore, even the third embodiment can achieve the same function/effect as achieved by the first embodiment described above.

4. Modifications

In the first to third embodiments described above, the first signal wires 26 include the narrower portions 26C. However, the widthwise dimension of each of the first signal wires 26 may also be constant all over the first signal wire 26. In this case, the entire first signal wire 26 corresponds to the narrower portion.

In the first and third embodiments described above, the first portion 25A corresponding to the pedestal conductive layer is configured as a part of the ground wire 25, and the pedestal corresponding portions 27A corresponding to the pedestal conductive layer are configured as parts of the second signal wires 27, but the configurations are not limited thereto. The wires 24 and the pedestal conductive layer may also be provided independently.

Also, in the first and third embodiments described above, the wire 24 having the first portion 25A corresponding to the pedestal conductive layer is configured as the ground wire 25, but the configuration is not limited thereto. The wire 24 having the first portion 25A may also be configured as a signal wire.

Also, in the first and third embodiments described above, in the pedestal 41, the first portion 25A of the ground wire 25 and the pedestal corresponding portions 27A of the second signal wires 27 are arranged in parallel to be spaced apart from each other in the left-right direction, but the arrangement is not limited thereto. It is sufficient for the pedestal portion 41 to include at least either one of the first portion 25A and the pedestal corresponding portions 27A.

Such modifications can also achieve the same function/ effect as achieved by the first embodiment described above. Note that the first to third embodiments and the modifications each described above can be combined with each other as required.

While the illustrative embodiments of the present invention are provided in the above description, such is for illustrative purpose only and it is not to be construed limitative. Modification and variation of the present invention which will be obvious to those skilled in the art is to be covered by the following claims.

What is claimed is:

1. A suspension board with circuit, comprising:
   a metal supporting layer;
   an insulating base layer disposed on a surface of the metal supporting layer located on one side thereof in a thickness direction;
   a conductive pattern disposed on a surface of the insulating base layer located on one side thereof in the thickness direction;
   an insulating cover layer disposed on the surface of the insulating base layer located on the one side thereof in the thickness direction so as to cover the conductive pattern; and
   a pedestal for supporting a slider, the pedestal including a thin pedestal portion, wherein
   the thin pedestal portion includes:
   a pedestal base layer included in the insulating base layer;
   a pedestal conductive layer included in the conductive pattern and disposed so as to extend over the pedestal base layer; and
   a pedestal cover layer included in the insulating cover layer and disposed on the pedestal conductive layer,
   the conductive pattern includes a first wire placed so as to extend over the insulating base layer,
   the first wire has a narrower portion where a dimension in a wire width dimension perpendicular to a direction in which the first wire extends is smallest, and
   a dimension of the pedestal conductive layer in a pedestal width direction perpendicular to a direction in which the pedestal conductive layer extends is 0.5 to 3 times the dimension of the narrower portion in the wire width direction.

2. A suspension board with circuit according to claim 1, further comprising:
   a slider mounting region including the pedestal, wherein
   the narrower portion is disposed outside the slider mounting region to be spaced apart from the pedestal conductive layer.

3. A suspension board with circuit according to claim 1, wherein
   the conductive pattern includes a second wire placed so as to extend over the insulating base layer, and
   the pedestal conductive layer is formed as a part of the second wire.

4. A suspension board with circuit according to claim 3, wherein the second wire is grounded to the metal supporting layer.

5. A suspension board with circuit according to claim 1, wherein a plurality of the pedestal conductive layers are arranged to be spaced apart from each other in the pedestal width direction.

* * * * *